United States Patent

[11] 3,533,420

| [72] | Inventors | Holly H. Maloney;<br>Albert L. Maloney, 62 Aikahi Loop, Kailua,<br>Hawaii 96734 |
|---|---|---|
| [21] | Appl. No. | 677,269 |
| [22] | Filed | Oct. 23, 1967 |
| [45] | Patented | Oct. 13, 1970 |

[54] DENTAL FLOSS HOLDER
2 Claims, 6 Drawing Figs.

[52] U.S. Cl. ..................................................... 132/92
[51] Int. Cl. ..................................................... A61c 15/00
[50] Field of Search........................................... 132/92, 91, 90

[56] References Cited
UNITED STATES PATENTS

| D.187,132 | 2/1960 | Griffin.......................... | D24/1 |
| 380,739 | 4/1888 | Bacon .......................... | 132/91 |
| 553,610 | 1/1896 | Falkenstein .................. | 132/92 |
| 2,162,240 | 6/1939 | Boldusoff..................... | 132/91 |
| 3,327,719 | 6/1967 | Ford............................. | 132/92 |
| 1,233,687 | 7/1917 | Muchow...................... | 132/92 |

FOREIGN PATENTS

| 560,615 | 7/1923 | France ......................... | 132/91 |

Primary Examiner—Louis G. Mancene
Assistant Examiner—Gregory E. McNeill
Attorney—Beveridge and De Grandi ABSTRACT: A dental floss holder having a head dimensioned to be inserted in the mouth to position a strand of dental floss between the teeth for cleaning. The dental floss is applied on the head over a recess through grooves positioned on opposite sides of the recess. An elongated handle projects from the head and has a retaining means for holding a floss supply spool for storage. An adjustable connection may be provided between the handle and the head to allow them to be adjusted into various angles as desired.

Patented Oct. 13, 1970

3,533,420

INVENTORS
ALBERT L. MALONEY
HOLLY H. MALONEY

BY Browne, Schuyler & Beveridge

ATTORNEYS

DENTAL FLOSS HOLDER

SUMMARY OF OBJECTS AND INVENTION

The present invention relates to a novel dental floss holder which may be inserted into the mouth for manipulating a strand of dental floss or other suitable strand material between teeth for cleaning purposes.

Dental authorities generally agree that dental floss is one of the few devices, if not the only device, that may be satisfactorily employed to thoroughly clean and remove food particles from between the teeth. However to the applicant's knowledge the present use of dental floss is awkward and inconvenient because it requires fingers of the hand holding the opposite end of the floss, to be placed in the mouth. The result is that only a relatively small percentage of pecentage of people use dental floss daily, contrary to the advice of dentists.

Accordingly, the present invention seeks to overcome the above problem with the provision of a novel dental floss holder which allows dental floss to be effectively manipulated between the teeth without requiring the placement of fingers in the mouth.

A further object of the present invention is to provide a dental floss holder which is highly simple and convenient to use.

A further object of the present invention is the provision of such a dental floss holder which will also allow the dental floss carried thereby to be placed between the teeth at an angle and operated in a seesaw motion thereby increasing the cleansing effect while at the same time avoiding injury to the gums.

A still further object is the provision of such a dental floss holder which will effectively operate in a minimum of mouth space and may also be positioned to hold the sides of the mouth away from the teeth to give free access to the teeth.

Yet another object of the present invention is to provide a dental floss holder which will accomplish the above objects and yet may be economically manufactured and retailed at relatively low prices so as to encourage widespread use and promotion of dental hygiene.

In one embodiment, the above objects are achieved by a dental floss holder having a generally planar body including an elongated handle merging into a generally C-shaped head formed with a recess to underlie a strand of dental floss which is connected across the head over the recess. In applying the dental floss to the head, it is initially wrapped around a first groove extending transversely between the handle and the head and then led in an arcuate groove in the peripheral edge of the head, after which it is passed through grooves on opposite sides of the recess, and then finally returned to the first groove where it is again wrapped around the body.

In another embodiment, an adjustable connection is interposed between the handle and the head such that the head may be adjusted into various predetermined angles and then fastened in the adjusted position. Additionally, the handle at its extremity is provided with a retaining means for holding a dental floss spool for storage purposes.

Other objects and advantages of the present invention will become apparent from the following more detailed description in conjunction with attached drawings in which.

DETAILED DESCRIPTION

Figure 1:
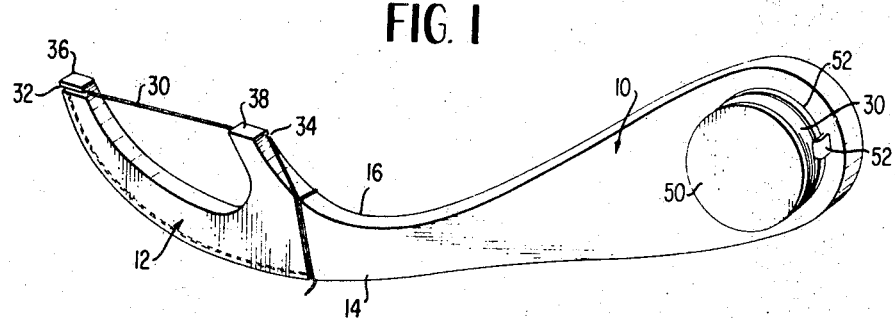
FIG. 1 is a perspective view of a dental floss holder embodying the present invention and shown with a strand of dental floss in position for use.
Figure 2:
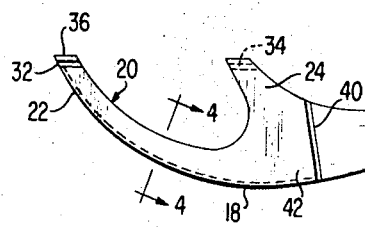
FIG. 2 is a side view of the holder with the dental floss and a storage spool removed.
Figure 4:
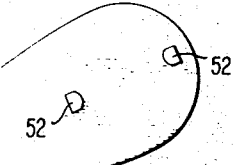
FIG. 4 is a cross-sectional view taken generally along lines 4-4 of FIG. 2.
Figure 3:
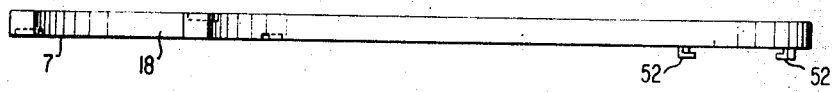
FIG. 3 is a view of the holder looking straight into one edge thereof.

Referring to the drawing in detail, FIG. 1 shows one embodiment of the holder of the present invention including a generally planar body, that may be formed from a suitable plastic material, including an elongated handle 10 merging into a generally C-shaped head 12 through a restricted or throat portion 14. The overall size of the holder body is such as to permit it to be conveniently grasped by handle 10 and to allow head 12 to be inserted comfortably into the mouth for cleaning as will be further described.

Head 12 is convexly curved along what will be termed the bottom edge 18 so as to facilitate entry and manipulation in the mouth. Opposite bottom edge 18, the head is formed with a recess 20 shown as having a generally C-shape, the opposite ends of which are defined by two prongs 22 and 24.

A strand of dental floss 30 or any other suitable strand material is placed across prongs 22 and 24 to overlie recess 20 whereby the head may be inserted into the mouth with the dental floss received between the teeth and the recess 20 providing sufficient room to manipulate the floss up and down and in a seesaw motion to remove particles of food between the teeth. In one embodiment such as illustrated in FIG. 1, the dental floss 30 is applied and maintained on the holder head through a series of grooves. Specifically, two grooves 32 and 34 are provided in opposite sides of prongs 22 and 24, respectively, just below the top surfaces 36 and 38 thereof. Additionally, an anchoring groove 40 is formed generally at the throat section 16 to extend transversely thereof. Anchoring groove 40 is connected to groove 42 formed in the curved bottom edge 18 of the head.

To apply the dental floss, it is initially wrapped around groove 40 several times and then passed forwardly through groove 42 and then reversed across recess 20 by passing it through grooves 32 and 34 after which it is pulled taut and then wrapped again several times around groove 40.

It will be seen that the groove arrangement will maintain the dental floss in proper position despite the pressure applied to it during use. In this regard, the portions of prongs 22 and 24 defining the top sides of grooves 32 and 34 will be effective to maintain the floss in the grooves despite vertical movement of the holder in use. Additionally, the oppositely disposed relationship of grooves 32 and 34 will prevent lateral displacement of the floss out of the grooves. If desired, the wrapped portion of the floss around groove 40 may be held between the forefinger and thumb during use to insure that the floss will remain taut across opening 20.

After a cleaning operation, the floss may easily be removed from the holder and a new one supplied for the next operation. In this latter regard, the handle is preferably formed with a suitable retaining means for holding a spool of dental floss such as designated by 50. In the embodiment of FIG. 1, this retaining means is provided by a pair of integral tabs 52 formed to project outwardly from one side of the handle to receive therebetween one of the flanges 54 of storage spool 50. Retaining tabs 52 have a flexible construction such that they may be deformed outwardly in order to attach or remove spool 50. In the specific embodiment, tabs 52 have a generally L-shaped cross section, and are integrally formed with the handle of the holder.

Figure 5:
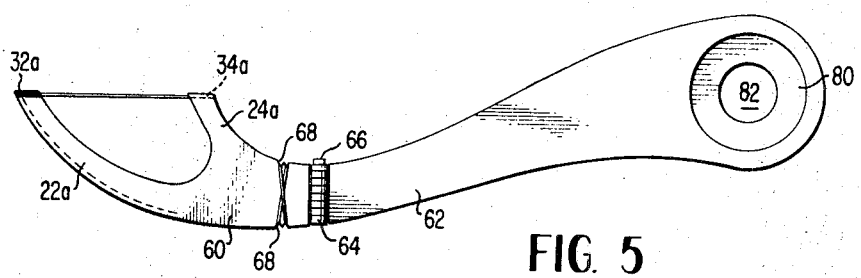
FIG. 5 is a side view of a holder representing a second embodiment of the present invention which incorporates an adjustable connection between handle and head portions of the holder.

Referring now to FIG. 5 there is illustrated another embodiment of the present invention wherein the head 60 and handle 62 of the holder are formed in separate pieces. An adjustable connection is formed between head 60 and handle 62 enabling them to be adjusted into various preselected angles; for example, to facilitate entry between upper and lower molar teeth in the mouth. In the specific embodiment shown, this adjustable connection includes a small hinge 64 connected between head 60 and handle 62 to enable them to be moved about the hinge pin 66 into a desired angular relationship. Hinge pin 66 is a head screw whose threads are engaged in corresponding threads in the eyes of the hinge so that upon advancement of the hinge pin, the hinge may be secured against movement with the head and handle in the desired relative positions.

Although not shown, any other suitable adjustable connection may be employed within the concept of the invention.

Also illustrated in the embodiment of FIG. 5 is a modified arrangement of the grooves in the prongs which receive the dental floss. In this modified version, grooves 32a and 34a are provided in the top surfaces of prongs 22a and 24a. Instead of groove 40 employed in the above described embodiment, the present embodiment is provided with a plurality of grooves 68 in its opposite edge portions between the handle and head sections. In this way, the ends of the floss may be wrapped in criss-cross fashion around grooves 68 to insure taut retention of the floss.

The embodiment of FIG. 5 also incorporates a modified retaining means for the floss storage spool. This retaining means takes the form of an annular recess 80 formed in one side of handle 62 to receive a hollow spool which fits over a hub 82 projecting centrally in the recess 80.

Figure 6:
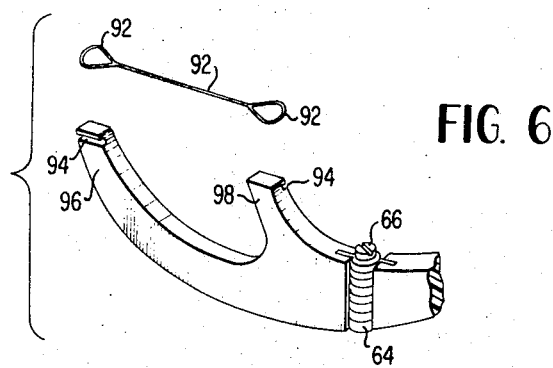
FIG. 6 is a fragmental perspective view of another modification of the invention.

In addition to the above-described methods of fastening the floss on the head, others will become apparent. For example FIG. 6 illustrates a floss 90 having looped ends 92 which may be applied about the prongs preferably in grooves 94. Preferably floss 92 is dimensioned and made of material such that it may be tensioned or stretched prior to application on the head after which it will remain in a tension state by virtue of the spacing between prongs 96 and 98 in relation to the length of the floss. The FIG. 6 embodiment also incorporates the hinge 64, 66 described above.

Other holder bodies may also be employed. For example and although not shown in the drawings, a steel wire body shaped to provide a handle and prongs for the head portion may be used instead of the planar body illustrated in the drawings. Moreover, other modifications readily apparent from the foregoing description and associated drawings, although not specifically mentioned herein, will nevertheless be included within the spirit and scope of the invention as indicated in the appended claims.

From the above description it will be apparent that the present invention provides an extremely useful tool which now makes it practical and convenient for dental floss to be employed in dental hygiene.

We claim:

1. A device for holding dental floss or similar strand material for manipulation between the teeth to remove particles between the teeth, comprising: a body having an elongated handle, a head portion, and a throat portion of reduced width intermediate the handle and the head portion, said head portion including a pair of coplanar prong-like members projecting in the same plane of the handle and forwardly and to one side of the body to define a recess with one prong-like member being located forwardly of the other prong-like member, said head portion having a convexly curved outer edge defining the outer edge of said one prong-like member and a concavely curved inner edge portion curved similar to said convexly curved outer edge defining the inner edge of said one prong-like member. said head portion having a concave curved edge portion defining the outer edge of said other prong-like member and curving forwardly and outwardly to said one side of the body from the throat portion, and means on the prong-like members for attaching the opposite ends of a strand to the extremities of the prong-like members across said recess and pivot means interconnecting said head portion and said handle portion at said throat portion for allowing said head portion to pivot at said throat portion to either side of said body about an axis extending transverse to the longitudinal direction of said body and lying substantially in the same plane as said head portion.

2. A device for holding dental floss for a manipulation between the teeth to remove particles between the teeth, comprising: a body having a handle, and a head portion forwardly of the handle, said head portion including a pair of prong-like members projecting generally in the same plane of the handle and forwardly to one side of the body to define a recess with one prong-like member being located forwardly of the other prong-like member, and pivot means interconnecting said head portion and said handle portion for allowing said head portion to pivot at said pivot means to either side of said body about an axis extending transverse to the longitudinal direction of said body and lying substantially in the same plane as said head portion.